United States Patent
Ran et al.

(10) Patent No.: US 10,956,986 B1
(45) Date of Patent: Mar. 23, 2021

(54) SYSTEM AND METHOD FOR AUTOMATIC ASSISTANCE OF TRANSACTION SORTING FOR USE WITH A TRANSACTION MANAGEMENT SERVICE

(71) Applicant: Intuit Inc., Mountain View, CA (US)

(72) Inventors: Alexander S. Ran, Palo Alto, CA (US); Christopher Lesner, Palo Alto, CA (US); Wei Wang, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 388 days.

(21) Appl. No.: 15/716,698

(22) Filed: Sep. 27, 2017

(51) Int. Cl.
*G06Q 40/00* (2012.01)
*G06F 16/2457* (2019.01)

(52) U.S. Cl.
CPC ....... *G06Q 40/12* (2013.12); *G06F 16/24573* (2019.01)

(58) Field of Classification Search
None
See application file for complete search history.

(56) References Cited

U.S. PATENT DOCUMENTS

| | | |
|---|---|---|
| 6,810,405 B1 | 10/2004 | LaRue et al. |
| 7,283,999 B1 | 10/2007 | Ramesh et al. |
| 7,428,636 B1 | 9/2008 | Waldspurger et al. |
| 7,457,950 B1 | 11/2008 | Brickell et al. |
| 7,668,769 B2 | 2/2010 | Baker et al. |
| 7,702,683 B1 | 4/2010 | Kirshenbaum |
| 7,815,106 B1 | 10/2010 | McConnell |
| 7,865,829 B1 | 1/2011 | Goldfield et al. |
| 7,890,754 B2 | 2/2011 | Waldspurger et al. |
| 8,024,660 B1 | 9/2011 | Quinn et al. |
| 8,037,145 B2 | 10/2011 | Bunker et al. |
| 8,046,298 B1 | 10/2011 | Voth et al. |
| 8,321,319 B1 | 11/2012 | Grossblatt et al. |

(Continued)

FOREIGN PATENT DOCUMENTS

| | | |
|---|---|---|
| JP | 5850592 | 12/2015 |
| WO | WO 2014/074075 | 5/2014 |

OTHER PUBLICATIONS

Hull, et al., "Paper Based Augmented Reality," Artificial Reality and Telexistence, 17th International Conference, pp. 205-209; IEEE, 2007.

(Continued)

*Primary Examiner* — Fateh M Obaid
(74) *Attorney, Agent, or Firm* — Paradice and Li LLP

(57) ABSTRACT

A system and method for use with a data management service provides automatic assistance of transaction data sorting to an account based on account name inferences. A table is generated from transactions that have been previously sorted to accounts, in which the table contains occurrence frequencies of associations between merchants and accounts. The occurrence frequencies of the table are utilized to analyze an unsorted transaction. The merchant associated with the unsorted transaction is matched to a merchant of the table. The occurrence frequencies of the accounts of the table associated with the matched merchant are determined. The accounts of the table are matched to accounts of the user's chart of accounts. A determined likelihood account is calculated for the unsorted transaction for account sorting.

10 Claims, 3 Drawing Sheets

(56) References Cited

U.S. PATENT DOCUMENTS

| | | | |
|---|---|---|---|
| 8,321,357 B2 | 11/2012 | Lapir et al. | |
| 8,374,986 B2 | 2/2013 | Indeck et al. | |
| 8,494,929 B1 | 7/2013 | Borgen et al. | |
| 8,544,726 B1 | 10/2013 | Hahn | |
| 8,571,919 B2 | 10/2013 | Rane et al. | |
| 8,655,862 B1 | 2/2014 | Riley et al. | |
| 8,661,038 B1 | 2/2014 | Whittam et al. | |
| 8,688,557 B2 | 4/2014 | Rose et al. | |
| 8,719,120 B1 | 5/2014 | McVickar et al. | |
| 8,798,354 B1 | 8/2014 | Bunzel et al. | |
| 8,855,377 B1 | 10/2014 | Madhani | |
| 8,892,597 B1* | 11/2014 | Strohman | G06F 16/3349 707/769 |
| 8,949,371 B1 | 2/2015 | Shrowty | |
| 8,977,626 B2 | 3/2015 | Hess | |
| 9,031,873 B2 | 5/2015 | Parson et al. | |
| 9,047,243 B2 | 6/2015 | Taylor et al. | |
| 9,305,056 B1 | 4/2016 | Gupta et al. | |
| 9,348,857 B2 | 5/2016 | Glover | |
| 9,424,333 B1* | 8/2016 | Bisignani | G06F 40/186 |
| 9,760,548 B2 | 9/2017 | Cooke et al. | |
| 9,904,959 B2 | 2/2018 | Katz et al. | |
| 9,916,383 B1 | 3/2018 | Ching | |
| 10,186,257 B1 | 1/2019 | Corfield | |
| 10,229,100 B1 | 3/2019 | Lesner et al. | |
| 10,460,298 B1 | 10/2019 | Ran et al. | |
| 2003/0078882 A1 | 4/2003 | Sukeda et al. | |
| 2004/0215543 A1 | 10/2004 | Betz et al. | |
| 2004/0225509 A1 | 11/2004 | Andre | |
| 2004/0249745 A1 | 12/2004 | Baaren | |
| 2005/0015296 A1 | 1/2005 | Dougan | |
| 2005/0080701 A1 | 4/2005 | Tunney et al. | |
| 2005/0091151 A1 | 4/2005 | Coleman et al. | |
| 2005/0120004 A1 | 6/2005 | Stata et al. | |
| 2005/0173812 A1* | 8/2005 | Morgenstern | H01L 23/10 257/787 |
| 2005/0222929 A1* | 10/2005 | Steier | G06Q 40/00 705/35 |
| 2005/0268217 A1 | 12/2005 | Garrison | |
| 2006/0200754 A1 | 9/2006 | Kablesh et al. | |
| 2006/0294311 A1 | 12/2006 | Fu et al. | |
| 2008/0027787 A1 | 1/2008 | Malsbenden et al. | |
| 2008/0077488 A1 | 3/2008 | Main et al. | |
| 2008/0086403 A1 | 4/2008 | Dilip et al. | |
| 2008/0301042 A1 | 12/2008 | Patzer | |
| 2008/0320056 A1 | 12/2008 | Mohanan et al. | |
| 2008/0320316 A1 | 12/2008 | Waldspurger et al. | |
| 2009/0144239 A1 | 6/2009 | Bevis et al. | |
| 2009/0183159 A1 | 7/2009 | Michael et al. | |
| 2009/0234683 A1 | 9/2009 | Anderson et al. | |
| 2009/0265198 A1 | 10/2009 | Lester et al. | |
| 2009/0276289 A1 | 11/2009 | Dickinson et al. | |
| 2009/0292632 A1 | 11/2009 | Dheer et al. | |
| 2010/0125447 A1 | 5/2010 | Goswami | |
| 2010/0250338 A1 | 9/2010 | Banerjee et al. | |
| 2010/0306032 A1 | 12/2010 | Jolley | |
| 2011/0022523 A1 | 1/2011 | Ruan | |
| 2011/0078098 A1 | 3/2011 | Lapir et al. | |
| 2011/0087606 A1 | 4/2011 | Hammond et al. | |
| 2011/0178841 A1 | 7/2011 | Rane et al. | |
| 2011/0178842 A1 | 7/2011 | Rane et al. | |
| 2011/0178844 A1 | 7/2011 | Rane et al. | |
| 2011/0178845 A1 | 7/2011 | Rane et al. | |
| 2011/0178847 A1 | 7/2011 | Rane et al. | |
| 2011/0178848 A1 | 7/2011 | Rane et al. | |
| 2011/0178849 A1 | 7/2011 | Rane et al. | |
| 2011/0197199 A1 | 8/2011 | Ye et al. | |
| 2011/0208588 A1 | 8/2011 | Joa et al. | |
| 2011/0246268 A1 | 10/2011 | Satyavolu et al. | |
| 2011/0264497 A1 | 10/2011 | Clyne | |
| 2012/0004968 A1 | 1/2012 | Satyavolu et al. | |
| 2012/0053987 A1 | 3/2012 | Satyavolu et al. | |
| 2012/0054049 A1 | 3/2012 | Hayes | |
| 2012/0078766 A1 | 3/2012 | Rose et al. | |
| 2012/0109723 A1 | 5/2012 | Crooks et al. | |
| 2012/0109749 A1 | 5/2012 | Subramanian et al. | |
| 2013/0006829 A1 | 1/2013 | Fairweather et al. | |
| 2013/0013491 A1 | 1/2013 | Selway et al. | |
| 2013/0073464 A1 | 3/2013 | Magpayo et al. | |
| 2013/0133048 A1 | 5/2013 | Wyn-Harris | |
| 2013/0159449 A1 | 6/2013 | Taylor et al. | |
| 2013/0232042 A1 | 9/2013 | Simpson et al. | |
| 2013/0232043 A1 | 9/2013 | Patel | |
| 2013/0238487 A1 | 9/2013 | Biske | |
| 2013/0268340 A1 | 10/2013 | Colon et al. | |
| 2013/0272523 A1 | 10/2013 | McCorkindale et al. | |
| 2013/0325548 A1 | 12/2013 | Kulkarni et al. | |
| 2013/0325674 A1 | 12/2013 | Yeri et al. | |
| 2013/0325680 A1 | 12/2013 | Satyavolu et al. | |
| 2013/0325681 A1 | 12/2013 | Somashekar et al. | |
| 2013/0325716 A1 | 12/2013 | Yeri et al. | |
| 2013/0346274 A1 | 12/2013 | Ferdinand et al. | |
| 2014/0041047 A1 | 2/2014 | Jaye et al. | |
| 2014/0052594 A1 | 2/2014 | Zimmer et al. | |
| 2014/0089186 A1 | 3/2014 | Dunn et al. | |
| 2014/0095486 A1 | 4/2014 | Caldwell | |
| 2014/0132608 A1 | 5/2014 | Mund et al. | |
| 2014/0149401 A1 | 5/2014 | Liu et al. | |
| 2014/0180826 A1 | 6/2014 | Boal | |
| 2014/0188756 A1 | 7/2014 | Ponnavaikko et al. | |
| 2014/0195395 A1 | 7/2014 | Bhakta et al. | |
| 2014/0195398 A1 | 7/2014 | Rose et al. | |
| 2014/0207524 A1 | 7/2014 | Just | |
| 2014/0222530 A1 | 8/2014 | Wegner et al. | |
| 2014/0230053 A1 | 8/2014 | Mote et al. | |
| 2014/0244457 A1 | 8/2014 | Howell et al. | |
| 2014/0258023 A1 | 9/2014 | Joa et al. | |
| 2014/0258063 A1 | 9/2014 | Chourasia et al. | |
| 2014/0279311 A1 | 9/2014 | Just | |
| 2014/0304130 A1 | 10/2014 | Winters et al. | |
| 2015/0051953 A1 | 2/2015 | Howe | |
| 2015/0095356 A1 | 4/2015 | Wu | |
| 2015/0142624 A1 | 5/2015 | Buttonow et al. | |
| 2015/0149892 A1 | 5/2015 | Roy et al. | |
| 2015/0178856 A1 | 6/2015 | Flores | |
| 2015/0186495 A1 | 7/2015 | Abbas | |
| 2015/0188751 A1 | 7/2015 | Vasseur et al. | |
| 2015/0193790 A1 | 7/2015 | Weinberger et al. | |
| 2015/0205777 A1 | 7/2015 | Campanelli et al. | |
| 2015/0206109 A1 | 7/2015 | Caldwell et al. | |
| 2015/0324410 A1 | 11/2015 | Glover | |
| 2015/0363704 A1 | 12/2015 | Yong et al. | |
| 2015/0379430 A1 | 12/2015 | Dirac et al. | |
| 2016/0063645 A1 | 3/2016 | Houseworth et al. | |
| 2016/0098790 A1 | 4/2016 | Herman et al. | |
| 2016/0125337 A1 | 5/2016 | von Walstrom et al. | |
| 2016/0125400 A1 | 5/2016 | Hu et al. | |
| 2016/0132857 A1 | 5/2016 | Unser et al. | |
| 2016/0133256 A1 | 5/2016 | Lembersky et al. | |
| 2016/0196577 A1 | 7/2016 | Reese et al. | |
| 2016/0217119 A1 | 7/2016 | Dakin et al. | |
| 2016/0247175 A1 | 8/2016 | Milton et al. | |
| 2017/0053012 A1 | 2/2017 | Levy et al. | |
| 2017/0148025 A1 | 5/2017 | Le et al. | |
| 2017/0178135 A1 | 6/2017 | Bull et al. | |
| 2017/0193045 A1 | 7/2017 | Young et al. | |
| 2017/0270521 A1 | 9/2017 | Good et al. | |
| 2017/0278111 A1 | 9/2017 | Gerard et al. | |
| 2017/0316506 A1 | 11/2017 | Lesner et al. | |
| 2017/0262872 A1 | 12/2017 | Fischer et al. | |
| 2018/0032973 A1 | 2/2018 | Sharma et al. | |
| 2018/0174170 A1 | 6/2018 | Lo Faro et al. | |
| 2018/0211330 A1* | 7/2018 | Ran | G06Q 40/12 |
| 2018/0260910 A1 | 9/2018 | Just | |
| 2018/0315059 A1* | 11/2018 | Venkatesh | G06Q 30/0269 |
| 2019/0005012 A1 | 1/2019 | Priestas et al. | |
| 2020/0098053 A1 | 3/2020 | Lesner et al. | |

OTHER PUBLICATIONS

Jurafsky, "Introduction to N-grams," Language Modeling, Lecture slides, published 2006, Accessed Sep. 14, 2020 at, https://web.stanford.edu/~jurafsky/slp3/slides/LM_4.pdf, 77-pages (Year: 2006).

(56) References Cited

OTHER PUBLICATIONS

Kornai et al., "Classifying the Hungarian Web," 10th Conference of the European Chapter of the Association for Computational Linguistics, pp. 203-210 (Year: 2003).

Rehurek et al., "Language Identification on the Web: Extending the Dictionary Method," Gelbukh A. (eds) Comp Ling and Intell Txt Proc., CICLing 2009. Lecture Notes in Comp Sci, vol. 5449. Pringer, Berlin, and Heidelberg, https://doi.org/10.1077/378-3-642-00382-0_29, 12-pages, (Year: 2009).

Teahan, "Text Classification and Segmentation Using Minimum Cross-Entropy," Proceeding of RIAO-00, 6th International Conference "Recherche d'Information Assistee par Ordinateur", Paris, FR, pp. 943-961, (Year: 2000).

\* cited by examiner

300

| MERCHANT ACCOUNT FREQUENCY TABLE 310 | | | |
|---|---|---|---|
| RECORD 311 | MERCHANT DATA 312 | ACCOUNT DATA 313 | OCCURRENCE FREQUENCY DATA 314 |
| 321 | commissions | escrow | 0.26855 |
| 322 | commissions | liability | 0.24575 |
| 323 | commissions | charges | 0.22675 |
| 324 | fee | charges | 0.22560 |
| 325 | airlines | travel | 0.23665 |
| 326 | air | travel | 0.24880 |
| 327 | airways | travel | 0.23810 |
| 328 | hotels | travel | 0.29660 |
| 329 | taxi | travel | 0.38700 |

FIG. 3

SYSTEM AND METHOD FOR AUTOMATIC ASSISTANCE OF TRANSACTION SORTING FOR USE WITH A TRANSACTION MANAGEMENT SERVICE

BACKGROUND

Electronic transaction management systems provide for the implementation of a company's chart of accounts and categorization of transactions. These charts of accounts and categorizations are essential for the creation of statements that enable a company's managers to assess a company's position. To measure a company's performance over time, an electronic transaction management system can generate one or more reports based on the chart of accounts or other transaction categorizations. For example, a report of an income statement may list the relevant revenues and expenses for a time period, in which those revenues and expenses are defined by the chart of accounts. By comparing reports from a current period of time with a prior period of time, company managers can understand a company's profitability to ensure that the company will deliver necessary income and remain solvent. Furthermore, reports and statements can demonstrate a company's return on investment, risk, financial flexibility, and operating capabilities. In particular, a chart of accounts, which enables financial reporting, is considered the foundation of a company's implementation of an accounting structure within a transaction management system.

Typically, each company that utilizes an electronic transaction management system will uniquely design its chart of accounts and transaction categorizations to summarize data into meaningful information. In particular, a proper design of a chart of accounts facilitates compliance with the operating and reporting requirements of each company's type of industry and business. Often, designing a chart of accounts is one of the first tasks to be performed when a company configures a new implementation of an accounting structure of a transaction management system. After the initial design of a company's chart of accounts, transactions are typically downloaded from various financial institutions that provide services to the company. In order to generate reports that compare time periods, downloaded historical transactions must each be sorted to a specific account of the chart of accounts. For example, if a company wishes to generate a report making a comparison to a prior year, a year of historical transactions must be sorted to appropriate accounts. This initial sorting of historical transactions to accounts is often an onerous manual task. Using current transaction management systems, an initial sorting of transactions is not assisted with automation because such automation relies on initial manual sorting of transactions determined by accounting staff. Thus, current transaction management system environments rely on a high volume of initial manual sorting decisions of the accounting staff to facilitate future automation assistance for the sorting of future transactions.

The initial manual sorting of transactions to accounts is a burdensome and costly process that can cause a new implementation of an accounting structure to fail. For example, the first fiscal period after a new implementation is frequently considered the most precarious. It is generally thought that an implementing company will only find value in the benefits of a new implementation of an accounting structure after a key fiscal period, such as a fiscal quarter, is completed. The implementation period of an accounting structure by an implementing company is a critical period because it is a time when a company is most likely to cancel a new implementation. Under current environments, the first-time use during the implementation period is also the time when there is an inordinate strain on a company's accounting staff to perform not only proper manual sorting of the current period transactions, but also additional manual sorting of historical transactions from prior time periods. Furthermore, account-sorting automation benefits cannot be realized under current environments until after the accomplishment of an initial manual sorting of transactions during an implementation period.

In addition, the current environment where there is little or no assistance provided for the initial sorting of transactions, and the resulting largely manual processes, provide significant opportunity for the introduction of human error. As discussed above, this is particularly true in light of the inordinate strain on a company's accounting staff created during the first-time use implementation period.

Consequently, what is needed is a system and method that solves the long standing technical problem in the data management arts of the inability of electronic transaction management systems to automatically assist with the sorting of transactions to an account of a chart of accounts, or other category, with a new implementation of a company's accounting structure within an electronic transaction management system.

SUMMARY

Embodiments of the present disclosure provide technical solutions that address some of the shortcomings associated with traditional transaction management systems by providing systems and methods to infer account names to which transactions can be sorted within a transaction management system. Embodiments of the present disclosure utilize account sorting decisions made by a plurality of users to determine a likely or most probable account name that can be provided to a user implementing a financial accounting structure, such as a new user of the transaction management system. In one embodiment, a new user may be a small business that has transitioned from a start-up entity to a revenue generating entity and therefore requires new comprehensive transaction management services.

Embodiments of the present disclosure provide a system and method for use with a transaction management service that provides automatic assistance for sorting transactions to accounts based on account name inferences. In one embodiment, data representing transactions for a plurality of users is stored in a data store. In one embodiment, data representing the plurality of users' previously made account sorting decisions to accounts is also stored in a data store.

In one embodiment, a table is generated from the transactions that have been previously sorted to accounts. In one embodiment, the table contains occurrence frequencies of associations between merchants and accounts. In one embodiment, the occurrence frequencies of the table are then utilized to analyze subsequent unsorted financial transactions associated with a new user.

In one embodiment, the merchant associated with the unsorted financial transaction is matched to a merchant of the table. The occurrence frequencies of the accounts of the table associated with the matched merchant are then determined. In one embodiment, the accounts of the table are matched to accounts of the new user's chart of accounts. Then, in one embodiment, a determined likelihood account is calculated for the unsorted financial transaction to provide automation assistance of account sorting.

BRIEF DESCRIPTION OF THE DRAWINGS

FIG. 3 is a diagram of examples of portions of illustrative data for inferring account names to which transactions can be sorted within a transaction management system, in accordance with various embodiments.

Figure 1:
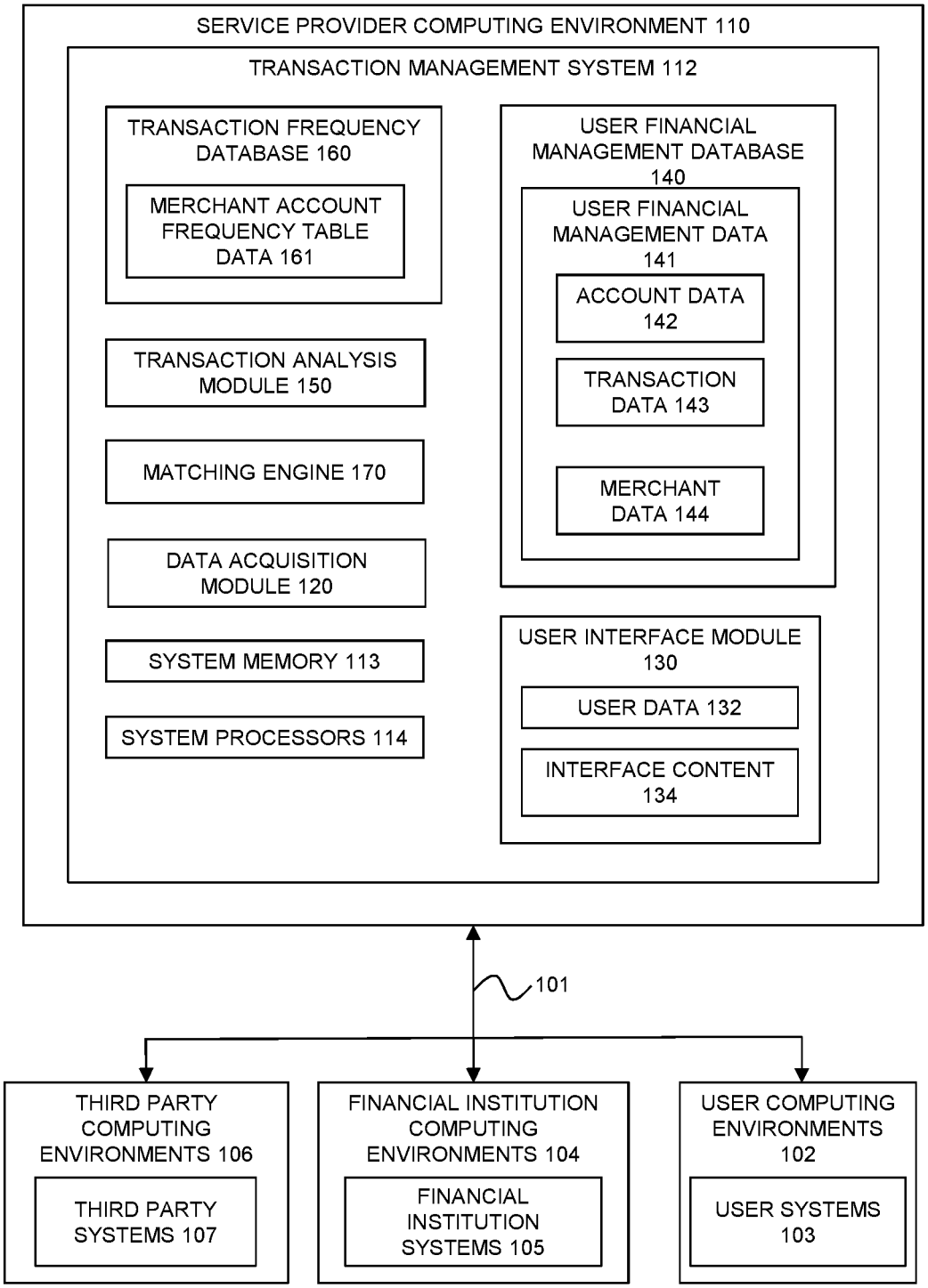
FIG. 1 is a functional block diagram of a production environment for inferring account names to which transactions can be sorted within a transaction management system, in accordance with various embodiments.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a Virtual Private Cloud (VPC); or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, communication channel, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term "data store" or "data storage device" includes, but is not limited to, any physical or virtual data source or storage device. For instance, in various embodiments, a data store or storage container can be, but is not limited to, one or more of a hard disk drive, a solid-state drive, an EEPROM, an optical disk, a server, a memory array, a database, a virtual database, a virtual memory, a virtual data directory, a non-transitory computer-readable medium, or other physical or virtual data sources.

As used herein, the terms "machine learning" and "machine learning algorithms" include, but are not limited to, machine learning algorithms for predictive model training operations such as one or more of artificial intelligence, regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

As used herein, the term "account" includes, but is not limited to, a grouping of transactions, such as, for a general ledger within an accounting system. For instance, in various embodiments, accounts can be hierarchical in that one account can contain the content of one or more other accounts. Hierarchical nesting accounts may also be structured to be either mutually exclusive or not mutually exclusive such that if there is a containment relationship between two accounts, then the containment may either be complete or partial.

As used herein, the term "chart of accounts" includes, but is not limited to, any categorizations of financial transaction data, any mappings of financial transaction data, or any other groupings of financial transaction data that is used or processed for the creation of financial statements that enable a company's manager to assess a company's financial position, a household's financial provider to assess a household's financial position, and the like.

Herein, a transaction management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term "transaction management system" includes, but is not limited to the following: computing system implemented, and/or online, and/or web-based, personal and/or business transaction management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of transaction management systems include, but are not limited to the following: QuickBooks™, available from Intuit, Inc. of Mountain View, Calif.; QuickBooks On-line™, available from Intuit, Inc. of Mountain View, Calif.; QuickBooks Self-Employed available from Intuit, Inc. of Mountain View, Calif.; Mint On-Line™, available from Intuit, Inc. of Mountain View, Calif.; Mint On-Line™, available from Intuit, Inc. of Mountain View, Calif.; TurboTax™, available from Intuit, Inc. of Mountain View, Calif., and/or various other transaction management systems discussed herein, and/or known to those of skill in the art at the time of filing, and/or as developed after the time of filing.

As used herein, the term "transaction" includes, but is not limited to, any operation through which ownership or control of any item or right is transferred from one party to another party. One specific illustrative example of a transaction is a financial transaction.

Embodiments of the present disclosure provide a system and method for use with a transaction management service that provides automatic assistance of financial transaction sorting to an account based on account name inferences. A table is generated from transactions that have been previously sorted to accounts, in which the table contains occurrence frequencies of associations between merchants and accounts. The occurrence frequencies of the table are utilized to analyze an unsorted financial transaction of the new user. The merchant associated with the unsorted financial transaction is matched to a merchant of the table. The occurrence frequencies of the accounts of the table associated with the matched merchant are determined. The accounts of the table are matched to accounts of the new user's chart of accounts. Then, a determined likelihood account is calculated for the unsorted financial transaction for automation assistance of account sorting.

The disclosed embodiments provide one or more technical solutions to the technical problem of dynamically assisting new users of a transaction management system to sort their downloaded transactions into an account of the new user's chart of accounts. These and other embodiments of a transaction management system are discussed in further detail below.

It is to be appreciated that the disclosed embodiments address some of the shortcomings of a transaction management system under current data management processing environments. For example, under a current transaction management system, account names were used for transaction sorting by matching descriptions of the business domains of merchants associated with the transaction to the account name. However, such required knowledge of the merchant and its business domain, which is often not the case in current transaction management systems.

Inferring account names to which transactions can be sorted within a transaction management system is a technical solution to a long standing technical problem and is not an abstract idea for at least a few reasons. First, inferring account names to which transactions can be sorted within a transaction management system is not an abstract idea because it is not merely an idea itself (e.g., can be performed mentally or using pen and paper). In contrast, the embodiments disclosed herein utilize and process special data from data management sources and multiple users, special algorithms including probabilistic algorithms, and customized user displays that are essential for the creation of statements that enable a company's manager to assess a company's financial position. In addition, using the disclosed embodiments, a transaction management system is provided that consistently, accurately, and efficiently provide a new user of the transaction management system with a determined likelihood account to which a downloaded transaction can be sorted yields significant improvement to the technical fields of data processing, data management, electronic financial management, data transmission, and user experience, according to one embodiment. The present disclosure adds significantly to the field of transaction management services because the disclosed service provider system: increases the likelihood that a new user will continue to utilize the transaction management system and not get discouraged with having to sort a large volume of historical transactions before the new user's loyalty to the transaction management system has been established; decreases the likelihood that a new user will sort transactions to incorrect accounts when first learning the transaction management system; and decreases the processor consumption associated with cleaning up incorrectly sorted transactions.

Second, inferring account names to which transactions can be sorted within a transaction management system is not an abstract idea because it is not a fundamental economic practice (e.g., is not merely creating a contractual relationship, hedging, mitigating a settlement risk, etc.). In contrast, the disclosed embodiments provide for the customized sorting of transactions that are essential for the creation of financial statements that enable a company's manager to assess a company's financial position. In addition, embodiments of the present disclosure allow for reduced use of processor cycles, memory, bandwidth, and power consumption associated with the efforts of both the financial system and users to sort the transactions into the accounts of the new users, and provide a solution to Internet and data processing problems. Consequently, computing and communication systems implementing or providing the embodiments of the present disclosure are transformed into more operationally efficient devices and systems.

Third, inferring account names to which transactions can be sorted within a transaction management system is not an abstract idea because it is not a method of organizing human activity (e.g., managing a game of bingo), but is rather, in one embodiment, a tool for providing a company's manager to assess a company's financial position through the creation of financial statements. In addition, using the disclosed embodiments, a transaction management system is provided that significantly improves the field of transaction management systems by reducing the amount of time it takes for a user to sort transactions, according to one embodiment. Therefore, both human and non-human resources are utilized more efficiently.

Fourth, although mathematics may be used in inferring account names to which transactions can be sorted within a transaction management system, the disclosed and claimed method and system of inferring account names to which transactions can be sorted within a transaction management system is not an abstract idea because the method and system is not simply a mathematical relationship/formula. In contrast, the disclosed embodiments provide for the customized sorting of transactions that are essential for the creation of financial statements that enable a company's manager to assess a company's financial position. In addition, using the disclosed embodiments, a transaction management system is provided that increases loyalty to the transaction management system. This results in repeat customers, efficient transaction management services, and reduced abandonment of use of the transaction management system, according to one embodiment.

Hardware Architecture

Embodiments of the present disclosure provide a system and method for use with a transaction management service that provides automatic assistance of transaction sorting to an account based on account name inferences. Under one embodiment, a new user may provide data representing a chart of accounts. In one embodiment, a new user may be presented with an input screen that enables the capture of account names, as well as account numbers, descriptions, account groupings, account sub-groupings, and other relevant information for the design of a chart of accounts. In one embodiment, a new user next provides data representing financial institutions, third party entities, and the like, from which transactions can be received. For example, a new user may have a checking account with a financial institution, such as a bank, that stores financial checking account transactions that indicate the deposits and withdrawals of funds from a checking account. In one embodiment, the new user may be presented with an input screen that enables the capture of a financial institution name, a financial institution identifying number, and other relevant information to access financial records stored in the financial institution's computing environment. Such financial institution information enables a financial management information system to request the transmittal of the user's transaction data from the financial institution computing environment to the transaction management system.

In one embodiment, the transaction management system receives a new user's transactions from a financial institution computing environment. A new user typically desires to present the transactions in a summarized format, such as summarized information presented in financial reports based on the user's chart of accounts. Accordingly, in order to generate such financial reports, the new user typically desires that each transaction transmitted from a financial institution computing environment be sorted to an account of the new user's chart of accounts.

It is to be appreciated that the transaction management system stores data representing transactions for many users. For example, a transaction management system may have two million or more users representing accountants, bookkeepers, business owners, and business staff who have made account sorting decisions, making available a vast financial management data store. This data store may be used to construct a merchant account frequency table. Furthermore, such a data store may be updated continuously with an increasing number of account sorting decisions performed by the plurality of users of the transaction management system. The constantly increasing number of account sorting decisions by the plurality of users enables continuous updating and improving of the merchant account frequency table.

In one embodiment, the transaction management system collects transaction data related to the transactions of the users of the transaction management system. The transaction data includes, for each transaction, merchant description data describing the merchant associated with the transaction data. A merchant may provide products or services to users, and may, for example, accept payment from users via a payment card such as a credit card, a debit card, and the like. In one embodiment, each merchant has a merchant identifier associated with it. The merchant may have a payment processing relationship with a financial institution such as a payment processing service provider that enables payments with payment cards. In one embodiment, the payment processing service may act as a third party to process payments on behalf of a financial institution.

In one embodiment, a user of a transaction management system may purchase a good or service from a merchant by means of a payment card. The merchant may transmit to a payment processing service the transaction representing the payment to the merchant from the user who is the payment card holder. The transaction may include a merchant identifier, a payment card number, a payment card holder name, an amount owed by the payment card holder, a verification code, and the like as might be beneficial or required to process a payment card transaction. In one embodiment, a payment card transaction is transmitted to a financial institution system that provides a financial service to the associated user.

In one embodiment, the financial institution system may transmit the transaction to a transaction management system that provides transaction management services to the user associated with the transaction. In one embodiment, the transaction management system may present to the user the transaction in order for the user to sort the transaction to an account of the user's chart of accounts. In one embodiment, the user is presented with an input screen that displays the transaction in user readable form and provides a listing of accounts of the chart of accounts that the user may select as part of the account sorting process.

In one embodiment, a transaction management system has two million or more users authorizing the import of transaction data from financial institutions with billions of transactions sorted to various accounts of the users' charts of accounts. It is to be understood that a user may name an account of its chart of accounts differently than other users. For example, a user may purchase an advertising product or service from an advertising merchandise company. One user may sort such a payment to an account named "Advertising," another user may sort such a payment to an account named "Marketing," another user may sort such a payment to an account named "Promotion," another user may sort such a payment to an account named "Selling Expense," and so on to meet the accounting needs of the respective users. Furthermore, users may name accounts with variations of similar words, such as "Advertising," "Advertisements," "Advertisement," "Ads," "Classified Ad," as well as other variations of similar words. Although many users may purchase the same product, such as a trade show kiosk, from the same advertising merchandise company, such as a trade show booth designer, yet the users may sort such similar transactions to accounts having names that may differ in one way or another.

In one embodiment, a transaction management system stores each transaction of each user in association with a respective account name of the respective user's chart of accounts. As can be imagined, a transaction management system may store billions of such transactions associated with various account names. In one embodiment, the transaction management system may gather such sorted transactions and associated account names. In one embodiment, each transaction has a merchant associated with it. In one embodiment, the merchant is represented by a merchant identifier, such as a unique number or string. In another embodiment, the merchant is represented by a string of characters that may or may not be unique. Such a string of characters may represent a human readable form of the business name of a merchant, such as a corporation name.

In one embodiment, for each transaction associated with a merchant, at least one string token is generated for the account name associated with the transaction. A string token may be a word, a shingle, an n-gram or the like. In one embodiment, the transaction management system may extract string tokens of selected length from an account name or other descriptive text. The string tokens can all have the same length or they may have different lengths. The string tokens may include spaces in the middle. The characters that make up the string tokens can include letters, numbers, punctuation marks, and other kinds of characters that may not commonly make up a word in a natural language.

In one embodiment, the transaction management system generates account string tokens by extracting n-length sequences of characters from every word in a data store of account names. In one embodiment, a string token may be an n-gram. An n-gram may be a contiguous sequence of n symbols from a given sequence of symbols, such as text. The letter n may refer to the size of the n-gram. For example, an n-gram of size one could be represented as 1-gram and referred to as a unigram, an n-gram of size two could be represented as 2-gram and referred to as a bigram, an n-gram of size three could be represented as 3-gram and referred to as a trigram, and so on. In one embodiment, a shingle is an n-gram that overlaps with other n-grams. In one embodiment, a tile is an n-gram that does not overlap with other n-grams. In one embodiment, a string token may comprise one or more words.

In one embodiment, for each transaction that has been sorted to an account, an occurrence frequency of string tokens of account names is determined for each respective merchant associated with the transactions. For example, if a string token is a 4-gram shingle, the account names of "advertising" and "advertisement" would share several 4-gram shingles such as "adve," "dyer," "vert," "erti," and "rtis." In one embodiment, one or more string tokens are extracted for a respective account name. In one embodiment, the occurrence frequencies of each of such 4-grams can be generated, such as a count value. In one embodiment, such occurrence frequencies can be normalized, such as a scaled value between zero and one.

In one embodiment, for each merchant identity, an occurrence frequency of a respective account name string token can be determined from a plurality of account names defined by a plurality of users. A merchant account frequency table can be generated or updated with the determined occurrence frequencies. For example, a table may contain rows of merchants. For each merchant row, the table may contain a normalized occurrence frequency for various string tokens that represent respective accounts to which transactions associated with the merchant have been sorted. It is to be understood that, although users choose different account words for their chart of accounts, there is often sub-parts of words that are more strongly associated with each other than the actual full word of an account for a particular merchant identity. Such associations of sub-parts of words can be utilized to create a merchant account frequency table. In one embodiment, the values of the merchant account frequency table represent the occurrence frequency of each string token associated with account names to which transactions of the merchant have been sorted by users.

In one embodiment, each transaction has a merchant identity that uniquely identifies the merchant. Such a merchant identity can be presented to the users in a consistent manner. The transaction management system may perform an operation to clean the merchant names in order to present a consistent merchant identity to the users. For example, a merchant with the name of A Bee Sea Corporation may also be known as ABC Corporation. In one embodiment, the transaction management system can use rules to determine that one transaction having a merchant name of A Bee Sea Corporation and another transaction have a merchant name of ABC Corporation are transactions related to the same merchant. For example, such determinations can be made via a unique vender identifier that is associated with the various business names that a merchant is doing business as. Accordingly, in one embodiment, a consistent merchant identity can be presented to a plurality of users.

In this embodiment, a single merchant identity may be associated with a plurality of string tokens of account names. For example, each string token of an account name can be considered a column of the table, each unique identifier of a merchant name can be considered a row of the table, and the occurrence frequency of the account name string tokens associated with merchant identifiers would be a value that represents how often the account name string tokens are associated with the merchant identifiers in a database of the transaction data of the transaction management system. In one embodiment, the occurrence frequency is a count across an entire data set. In one embodiment, the occurrence frequency is a normalized count across an entire data set. In one embodiment, the occurrence frequency is a numeric representation of a match between a merchant identity and an account name string token.

In one embodiment, the merchant identities may be inconsistent with respect to transactions from the same merchant for different users. For example, the same merchant may have merchant names of A Bee Sea Corporation and ABC Corporation, and there is not a unique merchant identifier associated with the transactions to relate such transactions with each other to the same merchant identity. Such variations in merchant names can occur because various financial institutions may associate different descriptive text to the transaction. Furthermore, such merchant name variations may arise if a financial institution introduces errors or misspellings in the text description associated with a merchant name. Under such an embodiment, string tokens can be extracted from the merchant names associated with the transactions. In one embodiment, a string token may be extracted from merchant information, such as names of merchants, merchant category codes, abbreviated names of merchants, truncated names of merchants, addresses, combinations of names and addresses, and the like.

In one embodiment, the merchant account frequency table can be expanded to include occurrence frequencies of string tokens of account names associated with string tokens of merchant names. For example, each string token of an account name can be considered a column of the table, each string token of a merchant name can be considered a row of the table, and the occurrence frequency of both string tokens would be a value that represents how often these two string tokens are associated together in a database of the transaction data of the transaction management system. Such may be advantageous because the impact of variations in merchant names may be significantly reduced for a large volume of transaction data in which many users are making account sorting decisions for the various merchant names, regardless of the accuracy of those described merchant names in comparison to the actual merchant names.

In one embodiment, a merchant account frequency table has at least one row for a merchant identity and at least one column for a token string of an account name. In this embodiment, there may be a plurality of columns of token strings for a respective account name. In one embodiment, the number of columns for a merchant identity row would be based on the number of accounts to which transactions associated with the merchant have been sorted by past and current users of the transaction management system. In one embodiment, the columns of string tokens of account names may be ordered based on the respective occurrence frequencies, such that the most frequent account name string token for a merchant is the first column for that row, and the second most frequent account name string token for the merchant is the second column.

In one embodiment, after the generation of such a merchant account frequency table, if a transaction is received for a new user that has defined a new chart of accounts, the transaction management system can determine the merchant identity for the received transaction of the new user. The transaction management system can search for the merchant identity of the received transaction in the merchant account frequency table. After a match of merchant identities is determined for a row of the table, the most frequently occurring account name string token can be determined. After that determination, the transaction management system can search for that account name string token within the new user's chart of accounts. If a match is made, the transaction management system can associate the matched account name to the received transaction. If a match is not made, then the transaction management system can attempt to make a match with the second most frequently occurring account name string token. If no match is made, then a match can be attempted for the third most frequently occurring account name string token, and so on until a string token of the applicable row from the merchant account frequency table matches a string token of an account name of the new user's chart of accounts.

In one embodiment, the match between an account name string token of the merchant account frequency table and an account name string token of the new user's chart of accounts may be an exact match, such that account names are exactly matched. For such exact matches, the string token may be the complete account name instead of string tokens of the account name. In one embodiment, such a match is an approximate match, such that account names are approximately matched.

In one embodiment, there is a decision procedure to determine a matching of string tokens to names. The matching determination may be to match account name string tokens to account names, to match merchant name string tokens to merchant names, and the like. In one embodiment, a decision procedure is based on a correlation score of every account name in a new user's chart of accounts with respect to the most likely string tokens of the account names from the merchant account frequency table. In one embodiment, a decision procedure is based on a score of every merchant name of a new user's received transactions with respect to the most likely matching string tokens of the merchant names from the merchant account frequency table.

In one embodiment, a decision procedure determines a most likely match of a string token, regardless of how likely the match is. For example, the likelihood of the match may be relatively weak, yet still greater than other choices, and an absolute determination is made. In one embodiment, a decision procedure may include a threshold determination in which a likelihood of a match must rise above a threshold occurrence frequency before a match is made. Such a threshold may be advantageous for optimization purposes, such as increasing the speed of the decision procedure. Such a threshold may further be advantageous to improve a user's experience of using the transaction management system, in that if a match is based on a weak probability, it is not presented to the user to prevent user frustration with a potentially weak match. For example, if a transaction is automatically sorted to the most likely account name based on the decision procedure, but the matched account name is not one that a user would have selected, it may be preferable to request the user make the sorting decision rather than making an incorrect automatic decision.

In one embodiment, a decision procedure generates a correlation score between different string tokens, such as account names, merchant names, and the like. For example, a most frequently occurring account name string token may imprecisely match an account name of a new user's chart of accounts. In contrast, a less frequently occurring account name string token may more precisely match the account name of the new user's chart of accounts. In other words, one account name may be more popular than others, but not in the new user's chart of accounts, but another account name may be less popular, but in the new user's chart of accounts. To assist with such correlation scoring, occurrence frequencies can be normalized, for example, to percentage values. Furthermore, scoring can be assisted through counting the number of operations that must be applied to a string token to achieve a match in comparison to the length of a string token or the number of string tokens extracted from an account name, or the like. In one embodiment, ratios between two string tokens is determined to assist with correlation scoring. In one embodiment, correlation scoring is based on a determination of a level of significance of an occurrence frequency of a string token of an account name.

In one embodiment, the transaction management system performs a prediction algorithm to predict to which account name an unsorted transaction should be sorted for a particular user when, for example, there is insufficient sorting history with the particular user to make a decision based on past sorting decisions by the user. The prediction algorithm utilizes account sorting decisions made by other users to predict a sorting decision by a particular user. The prediction algorithm can examine to which accounts other users have sorted similar transactions, and determine a match between those accounts of other users and an account of a particular user.

In one embodiment, if the prediction algorithm determines that two or more accounts of other users match at least one account of a particular user, then the two or more accounts of the other users are scored in relation to the at least one account of the particular user. Such scoring can be provided by means of similarity measures, such as a Jaccard Similarity Index, an Edit Distance, and the like as is known to one skilled in the art. A similarity measure can determine similarities and differences between two string tokens in order to facilitate correlation scoring between string tokens. For example, a prediction algorithm can utilize a similarity measure to determine the overlap between two string tokens, and may divide the overlap by the union of the string tokens. The prediction algorithm may utilize a similarity measure to score string tokens of account names that a plurality of users chose for sorting decisions in comparison to string tokens of account names of a new user's chart of accounts. The prediction algorithm may also utilize a similarity measure to score string tokens of merchant names associated with transactions of a plurality of users in comparison to string tokens of merchant names associated with a new user's transactions downloaded from a financial institution.

In one embodiment, the transaction management system generates a determined likelihood account to which a transaction can be sorted. In one embodiment, the determined likelihood account may be based on a maximum likelihood, a threshold likelihood, or the like. The determined likelihood account may be one of a new user's chart of accounts. The transaction management system may automatically sort the transaction to the determined likelihood account. The transaction management system may display the determined likelihood account to the user as a recommendation for sorting. The transaction management system may also display other likelihood accounts, such as a runner up likelihood account that is a next most likely account, and the user may choose to which account a transaction is to be sorted based on the recommendation.

In one embodiment, when the transaction management system receives transactions related to a new user, and the transactions are to be sorted to an account of the chart of accounts, the merchant account frequency table can be utilized to determine the likelihood of account sorting based on the sum of the occurrence frequencies of account name sorting decisions performed by a plurality of users for a merchant identity, in which the account name string tokens overlap with the string tokens of an account name string token of a new user's chart of accounts. Occurrence frequencies may be based on a summation, an average, a median, and the like. The likelihood of account sorting may be presented to the user as a percentage likelihood based on the overlap. For example, the transaction management system may display to the user that a recommended account name has a percentage match, such as a 95% match. A statement about a percentage match may be displayed to the user after the user presses an icon that indicates additional information about the recommendation is available. Such information of a percentage match may be beneficial to communicate an explanation to the user of how the account recommendation was generated.

In one embodiment, a recommendation of an account name may also be based on a recommendation for a merchant name. A description of a merchant name associated with a transaction may not be precisely specified, and the transaction management system may utilize string tokens to determine a determined likelihood merchant name. The likelihood of a merchant name may be presented to the user as a percentage likelihood based on overlaps of merchant name string tokens. For example, the transaction management system may display to the user that a recommended merchant name has a percentage match, such as a 96% match.

The disclosed embodiments for inferring account names to which transactions can be sorted within a transaction management system are useful to assist a new user to sort historical transactions to accounts of the new user's chart of accounts when there is no or limited history of such sorting decisions by the new user. The disclosed embodiments provide for significant improvements to the technical fields of electronic transaction data processing, data management, and user experience.

For example, the accounting staff members of a new user are responsible for managing the new user's transaction data. The user experience for the staff members is improved because the staff members receive assistance at a point in time when the staff members are especially vulnerable to committing data processing errors. Such errors often occur because the staff members are learning the functionality of the new transaction management system at the same time as having an excessive workload. Often, when a new user is transitioning to a new transaction management system, the new user is migrating from a prior, less powerful transaction management system. Nevertheless, during the transition, a new user will typically continue to utilize the prior transaction management system for a time, such as a month or a quarter, until the new user is assured that the new transaction management system is meeting the new user's expectations. Often, the staff members will experience a doubling in workload during the transition because they must process the same transaction twice, such as once in the prior transaction management system and once in the new transaction management system. In other words, the staff members are under heavy strain in workload during the transition, not just in learning a new system, but in keeping a prior system maintained for a period of time. It is to be appreciated that the disclosed embodiments improve data processing by avoiding additional burdens on the staff members of sorting to accounts the large volume of historical transactions that are initially downloaded from financial institutions. By removing at least this additional processing burden through automation assistance of the sorting of historical transactions, the staff members have a greater opportunity to focus on learning and fully utilizing the new transaction management system as the new user migrates from the prior transaction management system to the new transaction management system.

FIG. 1 is a functional block diagram of a production environment 100 for inferring account names to which transactions can be sorted within a transaction management system, in accordance with various embodiments.

The production environment 100 includes a service provider computing environment 110, user computing environments 102, financial institution computing environments 104, and third party computing environments 106, for inferring account names to which transactions can be sorted within a transaction management system 112, according to various embodiments. The computing environments 110, 102, 104, and 106 are communicatively coupled to each other with one or more communication channels 101, according to various embodiments. Communication channels 101 may include one or more physical or virtual networks.

The service provider computing environment 110 represents one or more computing systems such as one or more servers and/or distribution centers that are configured to receive, execute, and host one or more transaction management systems (e.g., applications) for access by one or more users, for inferring account names to which transactions can be sorted within a transaction management system 112, according to one embodiment. The service provider computing environment 110 represents a traditional data center computing environment, a virtual asset computing environment (e.g., a cloud computing environment), or a hybrid between a traditional data center computing environment and a virtual asset computing environment, according to various embodiments.

The service provider computing environment 110 includes the transaction management system 112, which is configured to provide transaction management services to a plurality of users. According to one embodiment, the transaction management system 112 is an electronic financial accounting system that assists users in bookkeeping or other financial accounting practices. Additionally, or alternatively, the transaction management system 112 can manage one or more of tax return preparation, banking, investments, loans, credit cards, real estate investments, retirement planning, bill pay, and budgeting. The transaction management system 112 can be a standalone system that provides transaction management services to users. Alternatively, the transaction management system 112 can be integrated into other software or service products provided by a service provider. In one embodiment, the service provider computing environment 110 includes system memory 113 and system processors 114.

In one embodiment, the transaction management system 112 can assist users in tracking expenditures and revenues by retrieving transaction data related to transactions of users and by enabling the users to sort the transactions into accounts. Each user can have multiple accounts, i.e. bookkeeping categories, into which the users' transactions can be sorted. The transaction management system 112 enables the users to generate and name their various accounts and to use the accounts for their own financial tracking purposes. The users, and the transaction management system, manage the transaction data based on the information regarding a determined likelihood account to which an unsorted transaction can be sorted.

In one embodiment, the transaction management system 112 improves the efficiency and effectiveness of transaction management services and other data management services by inferring account names to which unsorted transactions may be sorted. The transaction management system 112 may include a data acquisition module 120, a user interface module 130, a user financial management database 140, a transaction analysis module 150, a transaction frequency database 160, and a matching engine 170, according to various embodiments.

The user computing environments 102 correspond to computing environments of the various users of the transaction management system 112. The user computing environments 102 may include user systems 103. The users of the transaction management system 112 utilize the user computing environments 102 to interact with the transaction management system 112. The users of the transaction management system 112 can use the user computing environments 102 to provide data to the transaction management system 112 and to receive data, including transaction management services, from the transaction management system 112.

The users of the transaction management system 112 can include companies, businesses, organizations, government entities, individuals, groups of individuals, or any other entities for which transaction management services would be beneficial, according to one embodiment. Businesses of all kinds, including large corporations, midsize companies, small businesses, or even sole proprietor businesses, can utilize the transaction management system 112 to track and sort their transactions into various accounts as a way to better manage their finances. Likewise, government organizations may use the transaction management system 112 to sort their transactions into accounts in order to track various types of expenditures and revenues. Organizations other than businesses and government entities, such as nonprofit organizations, may also utilize the transaction management system 112 for the purpose of monitoring and sorting expenditures and revenues. Furthermore, individuals may utilize the transaction management system 112 to track their own revenues and expenditures. Thus, the term "user" can refer to many types of entities.

The user interface module 130 of the transaction management system 112 is configured to receive user data 132 from the users, according to one embodiment. The user data 132 may be derived from information, such as, but not limited to a name of a business, and address of a business, data related to individuals associated with the business, employee data, payroll data, authentication data that enables the user to access the transaction management system, or any other types of data that a user may provide in working with the transaction management system 112.

In one embodiment, the user data 132 may be derived from financial institution authentication data that enables the transaction management system 112 to access the financial accounts that the user has with financial institutions or other third parties. In one embodiment, the financial institution authentication data provided by the users as part of the user data 132 enables the transaction management system 112 to acquire information related to transactions of the users. The financial institution authentication data may be derived from data that allows the transaction management system 112 to gain access to credit card data, bank account data, retirement fund data, payroll data, income data, loan data, interest accrual data, student loan data, property ownership data, tax data, budgeting data, rent data, investments data, employment data, or other types of data regarding transactions or financial accounts of the users. Thus, the financial institution authentication data may be derived from login credentials and personal identification data for various websites of financial institutions. The financial institution authentication data of user data 132 may be derived from usernames, passwords, bank account numbers, routing numbers, credit card numbers, answers to security questions, identification numbers, government identification numbers, birth dates, addresses, or other types of verification credentials that allow the transaction management system 112 to gain access to online services of financial service institutions and third party institutions.

In one embodiment, the user data 132 can also include data provided by the users to create and name the various accounts that the users will use to sort and categorize transactions. These accounts can correspond to categories of revenues or expenses of the users into which transactions of the users can be sorted. The users can generate the accounts so that the transaction management system 112 can assist the users in better managing their finances. In one embodiment, a user can define the accounts to be members of a respective chart of accounts.

In one embodiment, the user interface module 130 provides interface content 134 to the user computing environments 102. The interface content 134 can include transaction data that enables the user to sort transactions into the various accounts of the user. The interface content 134 can include data enabling a user to obtain the current status of the user's financial accounts. For example, the interface content 134 can enable the user to select among the user's financial accounts in order to view transactions associated with the user's financial accounts. The interface content 134 can enable a user to view the overall state of many financial accounts. The interface content 134 can also enable a user to select among the various options in the transaction management system 112 in order to fully utilize the services of the transaction management system 112. The user can provide user data 132 in conjunction with the interface content 134 in order to sort transactions of the user into the user's accounts.

In one embodiment, the transaction management system 112 includes a user financial management database 140. The user financial management database 140 includes the user financial management data 141. The user financial management data 141 may be derived from data indicating the current status of all of the financial accounts of all of the users of the transaction management system 112. Thus, the user financial management database 140 can include a vast amount of data related to the transaction management services provided to users. In one embodiment, when the user utilizes the user interface module 130 to view interface content 134, the interface content 134 includes user financial management data 141 retrieved from the user financial management database 140.

In one embodiment, the user financial management data 141 includes account data 142 and transaction data 143. The user financial management data 141 can include, for each account of each user, a list of the transactions associated with the account. Thus, the user financial management data 141 can include a large number of accounts and a large number of transactions that have been sorted into each account.

In one embodiment, the user financial management data 141 includes merchant data 141. Each transaction in the user financial management data 141 may include merchant identification data that identifies the merchant or vendor involved in the transaction, such as a merchant being a counterparty to a transaction. In one example, a particular user has an account for expenses related to food provided to employees during lunch meetings, for special occasions, for office parties, etc. The merchant identification data for these transactions may identify various restaurants, bakeries, grocery stores, and caterers. These restaurants, bakeries, grocery stores, and caterers are the merchants or vendors associated with the transactions associated with that account.

In one embodiment, each transaction received in the transaction data 143 can include a merchant identifier indicated by the merchant identification data of the merchant data 144. The transaction management system 112 can use the merchant identification data to assist the users in sorting their transactions into the various accounts of the users. In one embodiment, the merchant identification data includes a merchant string. The merchant string can include a data string associated with a credit card transaction, a bank transaction, a checking account transaction, an online payment transaction, or other kinds of transactions. The merchant string for a given transaction may include a name of the merchant involved in the transaction, a part of the name of the merchant, a merchant identifier of the merchant, a merchant category code associated with the merchant, an address associated with the merchant, or other types of data that can potentially identify the merchant. In one embodiment, the transaction management system 112 can keep a list of the transactions and their associated merchant identification data so that users can access the user financial management data 141 and see a list of transactions to be sorted into the accounts of the users' chart of accounts. The users can then sort the transactions into the accounts.

In one embodiment, the data acquisition module 120 is configured to use the financial institution authentication data provided in the user data 132 to acquire transaction data 143 related to transactions of the users from the financial institution systems 105 of the financial institution computing environments 104. In addition, the data acquisition module 120 may use the financial institution authentication data to log into the online services of third party computing environments 106 of third-party financial institutions in order to retrieve transaction data 143 related to the transactions of users of the transaction management system 112. The data acquisition module 120 accesses the financial institutions by interfacing with the financial institution computing environments 104. The transaction data of the financial institution systems 105 may be derived from bank account deposits, bank account withdrawals, credit card transactions, credit card balances, credit card payment transactions, online payment service transactions, loan payment transactions, investment account transactions, retirement account transactions, mortgage payment transactions, rent payment transactions, bill pay transactions, budgeting information, or any other types of transactions. The data acquisition module 120 is configured to gather the transaction data 143 from financial institution computing environments 104 related to financial service institutions with which one or more users of the transaction management system 112 have a relationship.

In one example, the data acquisition module 120 uses the financial institution authentication data to acquire data related to withdrawals, deposits, and balances in the bank accounts of users. The transaction data 143 may be derived from data related to these withdrawals, deposits, and balances. Accordingly, the financial institution authentication data of user data 132 may be derived from usernames, passwords, bank account numbers, routing numbers, or other validation credentials needed to access online services of various banking institutions.

In one example, the data acquisition module 120 uses the financial institution authentication data to acquire data related to transactions associated with a credit card of the user. Thus, the transactions are credit card transactions including the purchase of goods or services from various merchant counterparties. The data acquisition module 120 uses the financial institution authentication data to access the online services of the company through which the user has a credit card. The transaction data 143 may be derived from data related to these purchases of goods and services.

In one embodiment, the data acquisition module 120 is configured to acquire data from third party systems 107 of third party computing environments 106. The data acquisition module 120 can request and receive data from the third party computing environments 106 to supply or supplement the transaction data 143, according to one embodiment. In one embodiment, the third party computing environments 106 automatically transmit financial data to the transaction management system 112 (e.g., to the data acquisition module 120), to be merged into the transaction data 143. The third party computing environment 106 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, the transaction data 143 includes, for each transaction, transaction description data. The transaction description data may be derived from data describing the particularities of the transaction. The transaction description data may be derived from data describing a merchant counterparty associated with the transaction, an amount of money associated with the transaction, a geolocation associated with the transaction, a date or time associated with the transaction, or a merchant category code associated with the transaction. The transaction description data may also be derived from data generated by the financial institution that facilitated the transaction for purposes internal to the financial institution.

In one embodiment, the transaction description data includes merchant identification data. Each transaction received in the transaction data 143 can include a merchant identification indicated by the merchant data 144. The transaction management system 112 can use the merchant data 144 to assist the users in sorting their transactions into the various accounts of the users. The user can also view the merchant identification data in order to identify the merchant counterparty involved in the transaction so that the user can have a proper understanding of the user's financial affairs or so that the user can sort the transaction into an account of the user. The merchant data 144 may be derived from a merchant string, a name of the merchant, a partial name of the merchant, an address of the merchant, a partial address of the merchant, an abbreviation of the merchant's name, a name of a parent company of the merchant, an industry code associated with the merchant, a merchant category code associated with the merchant, or other data associated with the merchant involved in the transaction.

In traditional transaction management systems, difficulties arise when a new user of traditional transaction management systems receive automatically downloaded transactions from a financial institution. Because there is no or limited history of how a new user sorts the transactions associated with a given merchant to accounts, the traditional transaction management system must request the user to make account sorting decisions without assistance or suggestions from the traditional transaction management system. The result is that new users are typically frustrated with the initial experience of using a traditional transaction management system.

The present disclosure provides systems and methods for inferring account names for new users based on account sorting decisions of other users of the transaction management system 112. After requesting services with the service provider computing environment 110, a new user may define a chart of accounts specific to the new user's business model. The user interface module 130 of the transaction management system 112 may be configured to receive chart of accounts information from the user systems 103 of the new user. The user interface module 130 may store the chart of accounts information as the account data 142 of the user financial management data 141. The account data 142 may represent a plurality of accounts associated with the new user's chart of accounts.

The user interface module 130 of the transaction management system 112 may be configured to receive from the new user's user systems 103 information about financial institutions with which the new user has a financial relationship. Such information may be stored as the user data 132. Such information may be used by the data acquisition module 120 of the transaction management system 112 to receive data from the financial institution computing environments 104 associated with respective financial institutions having financial relationships with the new user. The data acquisition module 120 may interface with the financial institution systems 105 of the financial institution computing environments 104.

The user interface module 130 of the transaction management system 112 may be configured to receive from the new user's user systems 103 information about third parties with which the new user has a business or financial relationship, whether direct or indirect. Such information may be stored as the user data 132. Such information may be used by the data acquisition module 120 of the transaction management system 112 to receive data from the third party computing environments 106 associated with respective third parties having business or financial relationships with the new user or with the financial institutions. The data acquisition module 120 may interface with the third party systems 107 of the third party computing environments 106.

The data acquisition module 120 of the transaction management system 112 may be configured to receive from the financial institution systems 105 one or more transactions associated with the new user. The data acquisition module 120 may store the received transactions as transaction data 143 of the user financial management data 141.

It is to be understood that other users' transactions are stored as user financial management data 141 of the user financial management database 140. Such user financial management data of a plurality of users may have been sorted to accounts by the plurality of users at an earlier time. Each user of the plurality of users may have designed a chart of accounts, and a plurality of charts of accounts would be stored as account data 142. Each transaction of the plurality of users may be stored as transaction data 143. The user financial management database 140 may store an association of the transaction data 143 with the account data 142 such that each sorted transaction may be associated with a respective account.

Each transaction stored as transaction data 143 may have a merchant identity associated with it, such as a merchant name, a unique merchant identifier, a merchant description, and the like. Merchant identities may be stored as merchant data 144. The user financial management database 140 may store an association of the transaction data 143 with the merchant data 144, such that each transaction be associated with a respective merchant.

The transaction analysis module 150 of the transaction management system 112 may analyze the transactions stored as the user financial management data 141. The transaction analysis module 150 may generate data for the merchant account frequency table data 161 of the transaction frequency database 160. The merchant account frequency table data 161 may represent a merchant account frequency table.

The transaction analysis module 150 may add data records to the merchant account frequency table data 161. For each transaction represented by the transaction data 143, the transaction analysis module 150 may extract a merchant identity from an associated merchant represented by the merchant data 144. The transaction analysis module 150 may store the merchant identities of the merchant as rows in a table represented by the merchant account frequency table data 161. The transaction analysis module 150 may determine whether the merchant identity is already represented as a row in the merchant account frequency table data 161, and if not, a new row is added to the merchant account frequency table data 161 to represent the merchant identity.

In one embodiment, when the merchant identity of a transaction is not a discrete identifier, the transaction analysis module 150 may extract one or more string tokens from the merchant identity associated with the transaction. Such a string token may be a word, a plurality of words, an n-gram, a shingle, or the like. For each string token extracted from the merchant identity, the transaction analysis module 150 may determine whether the merchant string token is already represented as a row in the merchant account frequency table data 161, and if not, a new row is added to the merchant account frequency table data 161 to represent the merchant string token. Under this embodiment, multiple rows of extracted merchant string tokens may be added for a single transaction based on how many string tokens are extracted from a merchant identity associated with a single transaction.

For each transaction represented by the transaction data 143, the transaction analysis module 150 may extract one or more string tokens from an associated account name represented by the account data 142. Such a string token may be a word, a plurality of words, an n-gram, a shingle, or the like. The extracted string tokens of the respective account names may be stored as columns in a table represented by the merchant account frequency table data 161. For each string token extracted from the account name, the transaction analysis module 150 may determine whether the account string token is already represented as a column in the merchant account frequency table data 161 associated with the applicable row, and if not, a new column is added to the merchant account frequency table data 161 for the applicable one or more rows to represent the account string token. Under this embodiment, multiple columns of extracted string tokens may be added for a single transaction based on how many string tokens are extracted from an account name associated with a single transaction.

For each transaction represented by the transaction data 143, the transaction analysis module 150 may determine the occurrence of the transaction associated with the respective merchant identity and the respective one or more account string tokens. In one embodiment, the transaction analysis module 150 may determine the occurrence of the transaction associated with the respective one or more merchant string tokens and the respective one or more account string tokens. Each occurrence determined by the transaction analysis module 150 may be utilized by the transaction analysis module 150 to update the respective occurrence frequencies of the merchant account frequency table data 161.

Returning to transactions of a new user that are received from the financial institution computing environments 104, each received transaction of a new user may be represented as the transaction data 143. The transaction management system 112 utilizes the matching engine 170 to match a transaction to an account. The matching engine 170 may match each received transaction of the new user to an account of the new user's chart of accounts. The matching engine 170 may base a match on occurrence frequency data of the merchant account frequency table data 161.

The matching engine 170 may begin a matching process by first analyzing the merchant identity associated with the transaction. The matching engine 170 can determine a match between the merchant identity of the transaction and a merchant identity represented in the merchant account frequency table data 161. This may allow the matching engine 170 to determine an applicable row of the merchant account frequency table data 161. For example, the transaction may include a description string that may include a full business name, a part of a business name, an abbreviation of the business, and the like. The matching engine 170 may identify potential matches between such description strings to merchant identities of the merchant account frequency table data 161.

The matching engine 170 may continue a matching process by next analyzing the account string tokens associated with the merchant identity of the merchant account frequency table data 161. Account string tokens may correspond to words in a natural language or may correspond to n-grams of defined or various lengths. For example, string tokens may include sequences of alphanumeric characters that are portions of natural language words, portions of multiple natural language words, multiple entire natural language words, a single natural language word, or the like. Account string tokens may be n-grams of the same selected length, such as k. For example, the account string tokens may comprise many of all k-character sequences of an account name. Account string tokens may be n-grams of various length, such as 3-5 characters in length. Such a character length may be beneficial for optimization of utilizing processor resources, yet still include n-gram sequences of sufficient length to facilitate matching performed by the matching engine 170.

The matching engine 170 may utilize the merchant account frequency table data 161 to determine a most frequently occurring account string token associated with the matched merchant identity. The matching engine 170 may use the rate of occurrence of an account string token to indicate a probability that the applicable account string token is a most frequently occurring account string token associated with the matched merchant identity in comparison to other account string tokens. Similarly, the matching engine 170 may use the rate of occurrence of another account string token to indicate a probability that the applicable account string token is a second frequently occurring account string token associated with the matched merchant identity in comparison to other account string tokens. Furthermore, the matching engine 170 may use rates of occurrences of other account string tokens to indicate the probability ranking of each respective account string token.

The matching engine 170 may next determine a match between the most frequently occurring account string token for a given merchant identity of the merchant account frequency table data 161 and a most likely account from the new user's chart of accounts represented in the account data 142. The matching engine 170 may extract string tokens for each account of a new user's chart of accounts and compare those string tokens to the most frequently occurring account string token associated with the merchant identity of the merchant account frequency table data 161. The matching engine 170 may perform a prediction algorithm to determine a probability that there is a match between an account string token derived from the new user's account data 142 and an account string token derived from the merchant account frequency table data 161. For example, a prediction algorithm may utilize a similarity measure to score the match. A prediction algorithm may incorporate a Jaccard Similarity Index, an Edit Index, and the like as is known to one skilled in the art.

The matching engine 170 may utilize a prediction algorithm to score each match between an account string token for an applicable merchant identity of the merchant account frequency table data 161 and an account string token extracted by the matching engine 170 from the new user's chart of accounts of the account data 142. When there is overlap of multiple account string tokens from the merchant account frequency table data 161 and an account string token from the account data 142 associated with the new user, the matching engine 170 may sum the respective occurrence frequencies of the overlapping account string tokens in order to aid in a more accurate score for matching.

The matching engine 170 may use the plurality of scores of the applicable account string tokens of the merchant account frequency table data 161 in relation to the applicable account string tokens of the account user data 142 in order to determine a determined likelihood account that is a member of the new user's chart of accounts. In some embodiments, the matching engine 170 may automatically sort the applicable transaction into the determined likelihood account of the user's chart of accounts represented by account data 142. In some embodiments, after the matching engine 170 determines the determined likelihood account, the transaction management system 112 recommends the determined likelihood account to the new user as an account to which the respective transaction represented by the transaction data 143 can be sorted. Such may be beneficial to provide improved transaction management services to the new user. For example, when a new user accesses the user financial management data 141, the transaction that was downloaded from the financial institution systems 105 may be presented to the new user. The user interface module may interface with user systems 103 of the new user and display a human-readable representation of the transaction and a representation of the determined likelihood account. The new user may select the determined likelihood account or may choose a different account of the new user's chart of accounts.

The matching engine 170 may match a merchant identity of the merchant account frequency table data 161 with a merchant identity of the new user's transaction of the transaction data 143. In one embodiment, the merchant identity of the merchant account frequency table data 161 is represented by one or more string tokens of the merchant name. Under this embodiment, each such merchant string token may be represented as a respective row of the merchant account frequency table data 161. The matching engine 170 may utilize a prediction algorithm having a similarity measure to score a match between a merchant string token of the merchant account frequency table data 161 and a merchant string token of the merchant data 144. A prediction algorithm may incorporate a Jaccard Similarity Index, an Edit Index, and the like as is known to one skilled in the art. The matching engine 170 can determine the determined likelihood merchant. The matching engine 170 can use the determined likelihood merchant to determine the applicable row or rows of the merchant account frequency table data 161, and can utilize those rows to determine the determined likelihood account, as described above. In some embodiments, the transaction management system 112 can present the determined likelihood merchant to the user for verification that the matching engine's prediction process matched to the correct merchant.

It is to be understood that the description of the merchant account frequency table data 161 having rows of merchant identities or merchant string tokens and columns of account names or account string tokens is for illustrative purposes, and that other representations of the data, as is known to one skilled in the art, may be utilized.

In one embodiment, the production environment 100 performs one or more machine learning algorithms in which feedback data is collected from a plurality of users who have made and will continue to make account sorting decisions. As the feedback data from the plurality of users is collected, the machine learning algorithms may be improved or modified based on the feedback data by incorporating artificial intelligence into the machine learning algorithms. Accordingly, artificial intelligence mechanisms are used to improve the system on an ongoing basis. For example, the transaction analysis module 150 may perform one or more machine learning algorithms to improve the merchant account frequency table data 161 based on data collected from users. Furthermore, as new unsorted transactions are analyzed by the matching engine 170, the merchant account frequency table data 161 may be based on information collected during a matching process, such as when a user confirms the applicability of a determined likelihood account to a new unsorted transaction.

Process

Figure 2:
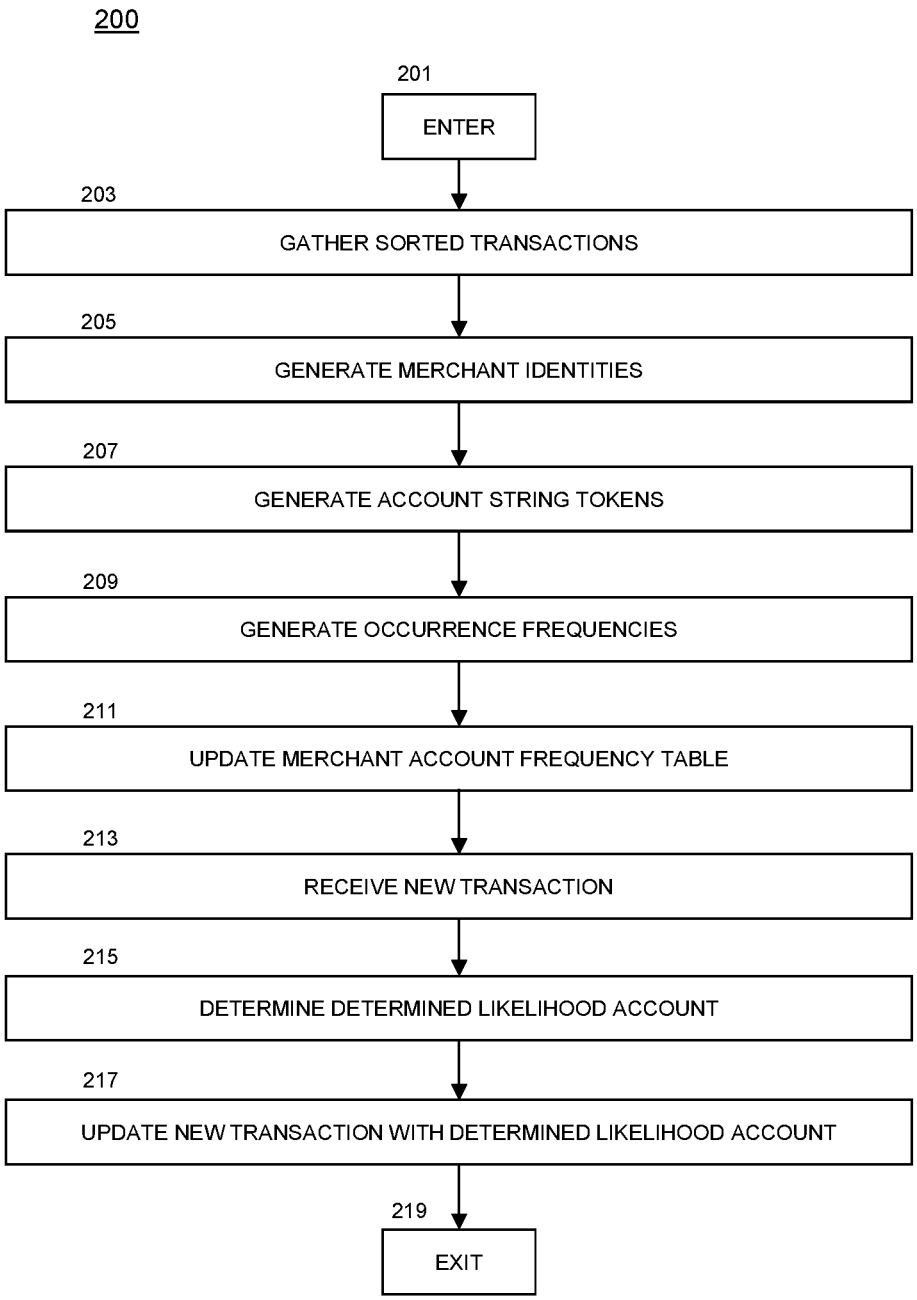
FIG. 2 is a flow diagram of a process for inferring account names to which transactions can be sorted within a transaction management system, in accordance with various embodiments.

FIG. 2 is a flow diagram of a process 200 for inferring account names to which transactions can be sorted within a transaction management system, in accordance with various embodiments. Referring to FIGS. 1 and 2 together, the process 200 for inferring account names to which transactions can be sorted within a transaction management system begins at ENTER OPERATION 201 and process flow proceeds to GATHER SORTED TRANSACTIONS OPERATION 203.

In one embodiment, at GATHER SORTED TRANSACTIONS OPERATION 203, the data acquisition module 120 of the transaction management system 112 gathers a plurality of sorted transaction data representing a plurality of transactions, such that each sorted transaction datum of the plurality of sorted transaction data is associated with an account name datum of a plurality of account name data representing a plurality of accounts, and such that each sorted transaction datum of the plurality of sorted transaction data is associated with a user datum of a plurality of user data representing users of a transaction management system 112. In one embodiment, the plurality of sorted transaction data is represented by the transaction data 143. The data acquisition module 120 may have received the transaction data 143 from the financial institution computing environments 104, third party computing environments 106, and the like. The received transaction data 143 may have an association with the merchant data 144. The user interface module 130 may have interfaced with the user computing environments 102 so that a plurality of users may have sorted the transaction data 143 to create an association with account data 142. For example, each transaction datum may have a merchant identifier datum associated with it and may be sorted to an account name datum. The account name datum may be a member of a respective user's chart of accounts data.

In one embodiment, the account name datum is associated to chart of accounts data that represents a plurality of charts of accounts of the users of the transaction management system. In one embodiment, each chart of accounts of the plurality of charts of accounts is associated with a respective user of the users of the transaction management system. In one embodiment, each of the plurality of charts of accounts includes one or more of a categorization of transaction data, a mapping of transaction data, or a grouping of transaction data. In one embodiment, each sorted transaction datum represents a transaction that was sorted to a respective account name datum by a respective user of the users of the transaction management system.

In one embodiment, once the plurality of sorted transaction data is gathered at GATHER SORTED TRANSACTIONS OPERATION 203, process flow proceeds to GENERATE MERCHANT IDENTITIES OPERATION 205.

In one embodiment, at GENERATE MERCHANT IDENTITIES OPERATION 205, the transaction analysis module 150 generates, from the plurality of sorted transaction data, a plurality of merchant identity data representing a plurality of merchant identities. In one embodiment, the plurality of merchant identity data is represented by the merchant data 144.

In one embodiment, each merchant identity datum of the plurality of merchant identity data represents a respective text string of a merchant name. For example, a merchant identity is a text name that identifies a merchant, such that a user would be capable of recognizing the text name as representing the merchant. In one embodiment, each merchant identity datum of the plurality of merchant identity data represents a respective unique identifier of a merchant. For example, a merchant identity may be a unique identifier that uniquely identifies a merchant, such as a serial number, a code, or the like. In one embodiment, each merchant identity datum of the plurality of merchant identity data represents a respective merchant string token. In one embodiment, each merchant identity datum of the plurality of merchant identity data represents a respective merchant n-gram comprising a portion of characters of a merchant name. For example, a merchant identity may be represented by one or more string tokens, such as one or more n-grams. In one embodiment, the transaction analysis module 150 extracts n-grams from the merchant names of the merchant data 144.

In one embodiment, once the plurality of merchant identity data is generated at GENERATE MERCHANT IDENTITIES OPERATION 205, process flow proceeds to GENERATE ACCOUNT STRING TOKENS OPERATION 207.

In one embodiment, at GENERATE ACCOUNT STRING TOKENS OPERATION 207, the transaction analysis module 150 generates, from the plurality of sorted transaction data, a plurality of account string token data representing a plurality of account string tokens extracted from the plurality of account name data. In one embodiment, the plurality of account name data is represented by the account data 142.

In one embodiment, each account string token datum of the plurality of account string token data represents a respective one or more words of an account name. For example, an account name is a text string that identifies a merchant, such that a user would be capable of recognizing the text string as representing the account. In one embodiment, each account string token datum of the plurality of account string token data represents a respective account n-gram comprising a portion of characters of an account name. In one embodiment, the transaction analysis module 150 extracts n-grams from the account names of the account data 142. In one embodiment, each account string token datum of the plurality of account string token data represents a respective shingle.

In one embodiment, once the plurality of account string token data is generated at GENERATE ACCOUNT STRING TOKENS OPERATION 207, process flow proceeds to GENERATE OCCURRENCE FREQUENCIES OPERATION 209.

In one embodiment, at GENERATE OCCURRENCE FREQUENCIES OPERATION 209, the transaction analysis module 150 generates, from the plurality of sorted transaction data, a plurality of occurrence frequency data representing a plurality of occurrence frequencies, such that each occurrence frequency datum of the plurality of occurrence frequency data is associated with a merchant identity datum of the plurality of merchant identity data and is associated with an account string token datum of the plurality of account string token data. In one embodiment, an occurrence frequency is a representation of the occurrences that a transaction datum of the transaction data 143 that is associated with a merchant datum of the merchant data 144 was sorted to an account datum of the account data 142. Such occurrence frequencies may be a numerical count, a normalized count, or the like.

In one embodiment, each occurrence frequency datum of the plurality of occurrence frequency data represents a respective count value. In one embodiment. In one embodiment, each occurrence frequency datum of the plurality of occurrence frequency data represents a respective normalized value In one embodiment, once the plurality of occurrence frequency data is generated at GENERATE OCCURRENCE FREQUENCIES OPERATION 209, process flow proceeds to UPDATE MERCHANT ACCOUNT FREQUENCY TABLE OPERATION 211.

In one embodiment, at UPDATE MERCHANT ACCOUNT FREQUENCY TABLE OPERATION 211, the transaction analysis module 150 updates the merchant account frequency table data 161. In one embodiment, for each occurrence frequency datum of the plurality of occurrence frequency data, the merchant account frequency table data 161 updates the merchant account frequency table data 161 representing a merchant account frequency table with the respective occurrence frequency datum, the associated merchant identity datum, and the associated account string token datum. In one embodiment, updating the merchant account frequency table data 161 includes adding data, replacing data, modifying data, and the like.

In one embodiment, the merchant account frequency table data 161 can be organized as rows and columns, in which the rows represent merchants and the columns represent accounts. For example, each row may comprise a merchant identity and each column may comprise an account string token, and the value is the occurrence frequency of the applicable merchant identity and the account string token. In one embodiment, the merchant account frequency table data 161 can be organized as records having fields. For example, a record may have a first field for a merchant identity, a second field for an account string token, and a third field for an occurrence frequency of the applicable merchant identity and the account string token. It is to be understood that the merchant account frequency table data 161 can be organized to store data for analysis, as is known to one skilled in the art.

In one embodiment, once the merchant account frequency table data 161 has been updated at UPDATE MERCHANT ACCOUNT FREQUENCY TABLE OPERATION 211, process flow proceeds to RECEIVE NEW TRANSACTION OPERATION 213.

In one embodiment, at RECEIVE NEW TRANSACTION OPERATION 213, the data acquisition module 120 receives a new transaction datum representing an unsorted transaction from a financial institution system of the financial institution systems 105. In one embodiment, the new transaction datum is associated with a new user of the transaction management system 112. In one embodiment, the new transaction datum is associated with a new implementation of a new user of the transaction management system.

In one embodiment, once the new transaction datum is received at RECEIVE NEW TRANSACTION OPERATION 213, process flow proceeds to DETERMINE DETERMINED LIKELIHOOD ACCOUNT OPERATION 215.

In one embodiment, at DETERMINE DETERMINED LIKELIHOOD ACCOUNT OPERATION 215, the matching engine 170 determines a determined likelihood account datum representing a determined account name match with the new transaction datum based on the merchant account frequency table data 161. In one embodiment, the transaction management system generates a determined likelihood account to which a transaction can be sorted. The determined likelihood account may be one of a new user's chart of accounts. The determined likelihood account may be a determined likelihood account name that can be displayed to a user in human readable format.

In one embodiment, the matching engine 170 determines a runner up likelihood account datum representing a runner up account name match with the new transaction datum based on the merchant account frequency table data 161. In one embodiment, the user interface module 130 may replace the sorting relationship of the new transaction datum from the determined likelihood account datum to the runner up likelihood account datum.

In one embodiment, once the determined likelihood account datum is determined at DETERMINE DETERMINED LIKELIHOOD ACCOUNT OPERATION 215, process flow proceeds to UPDATE NEW TRANSACTION WITH DETERMINED LIKELIHOOD ACCOUNT OPERATION 217.

In one embodiment, at UPDATE NEW TRANSACTION WITH DETERMINED LIKELIHOOD ACCOUNT OPERATION 217, the user interface module 130 updates the new transaction datum to have a sorting relationship with the determined likelihood account datum. In one embodiment, the user interface module 130 automatically sorts the transaction into an account of the user represented by the determined likelihood account datum. In one embodiment, user interface module 130 may display the determined likelihood account to the user as a recommendation for sorting.

In one embodiment, once the new transaction datum is updated to have an association with the determined likelihood account datum at UPDATE NEW TRANSACTION WITH DETERMINED LIKELIHOOD ACCOUNT OPERATION 217, process flow proceeds to EXIT OPERATION 219.

In one embodiment, at EXIT OPERATION 219, process 200 for inferring account names to which transactions can be sorted within a transaction management system is exited.

In one embodiment, the transaction analysis module 150 gathers merchant account frequency table data representing a merchant account frequency table from a user financial management database, such that the merchant account frequency table data comprises a plurality of occurrence frequency data representing a plurality of occurrence frequencies, an associated plurality of merchant data representing a plurality of merchants, and an associated plurality of account data representing a plurality of accounts. In one embodiment, the data acquisition module 120 receives a new transaction datum that represents an unsorted transaction from a financial institution system. In one embodiment, the matching engine 170 determines a determined likelihood account datum that represents a determined account name match with the new transaction datum based on the merchant account frequency table data. In one embodiment, the user interface module 130 provides financial management assistance to a user associated with the new transaction datum based on the determined likelihood account datum.

In one embodiment, the determined likelihood account datum is determined based on a correlation score correlating an account string token datum of the associated plurality of account data of the merchant account frequency table data with account data associated with chart of accounts data of the user. In one embodiment, the determined likelihood account datum is determined based on a prediction algorithm that measures a similarity between an account string token datum of the associated plurality of account data of the merchant account frequency table data with account data associated with chart of accounts data of the user. In one embodiment, the determined likelihood account datum is determined based on a prediction algorithm that utilizes a Jaccard Similarity Index similarity measure. In one embodiment, the determined likelihood account datum is determined based on a prediction algorithm that utilizes an Edit Distance similarity measure.

FIG. 3 is a diagram of examples 300 of portions of illustrative data for inferring account names to which transactions can be sorted within a transaction management system, in accordance with various embodiments. Referring to FIGS. 1, 2, and 3 together, a merchant account frequency table 310 may be represented by the merchant account frequency table data 161 of the transaction frequency database 160. The merchant account frequency table 310 illustrates nine example records having record fields 311 of "321," "322," "323," "324," "325," "326," "327," "328," and "329," and it is to be understood that the merchant account frequency table 310 may include many more records than those illustrated. The merchant account frequency table 310 may include a record field 311, which in the example is an illustrative number to identify each example. The merchant account frequency table 310 may include a merchant data field 312 and an account data field 313. The merchant account frequency table 310 may also include an occurrence frequency data field 314, which may represent normalized values of the association between the merchant data field 312 and the account data field 313.

It is to be understood that there are many ways that the merchant account frequency table data 161 can be illustrated, and the illustration of the merchant account frequency table 310 is an example of one embodiment and is not meant to be limiting. In the illustrated examples 300, the merchant data field 312 and the account data field 313 are words of textual strings. In other embodiments, such fields may be n-grams, or the like. Furthermore, in the illustrated examples 300, the occurrence frequency data field 314 is illustrated as numerical values between zero and one. In other embodiments, such may be illustrated as count values and the like.

In one embodiment, the merchant account frequency table 310 is the result of UPDATE MERCHANT ACCOUNT FREQUENCY TABLE OPERATION 211, in which the merchant account frequency table 310 is represented by the merchant account frequency table data 161 that has been updated. When the process flow of the process 200 proceeds to RECEIVE NEW TRANSACTION OPERATION 213, a new transaction may have a merchant identity associated with it that may, for example, contain the word "commissions." The matching engine 170 may match this word with the record fields 311 of "321," "322," and "323" of the merchant account frequency table 310. In this example, the record field 311 of "324" would not be considered because the merchant data field 312 of "fee" would not match to "commissions."

As illustrated, the account data field 313 of "escrow" has the occurrence frequency data field 314 of 0.26855. The account data field 313 of "liability" has the occurrence frequency data field 314 of 0.24575 that is a lower value. The account data field 313 of "charges" has the occurrence frequency data field 314 of 0.22675 that is an even lower value. If a new user's chart of accounts includes an account having the word "escrow," another account having the word "liability," and another account having the word "charges," then the account having the word "escrow" may be determined to be the determined likelihood account, because that account data field 313 is associated with the higher value of the occurrence frequency data field 314. Alternatively, if the new user's chart of accounts contains an account having the word "liability" but not an account having the word "escrow," then the next account data field 313 of "liability" may be the determined likelihood account. Thus, under this example, a new transaction having an associated merchant word of "commissions" would be matched to appropriate records of the merchant account frequency table 310, the associated account data field 313 would be determined, and the matched words would be scored in relation to a new user's chart of accounts and the occurrence frequency data field 314, which would determine a determined likelihood account.

In one embodiment, the matching engine 170 may match a merchant identity of a new transaction of the transaction data 143 to an appropriate merchant data field 312 of the merchant account frequency table 310. For example, a merchant identity of "DEF Airways Corp" may be matched to the record field 311 of "327" that has a corresponding merchant data field 312 of "airways," and may match as a second record field 311 of "326" that has a corresponding merchant data field 312 of "air." In this example, because of the overlap of "air" and "airways," the matching engine may merge the respective occurrence frequency data field 314, such as to combine the values of "0.24880" and "0.23810."

After determining the determined likelihood account, in one embodiment, the new transaction can be updated to reflect a sorting relationship with the determined likelihood account.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for automatically sorting a user's transactions into the user's chart of accounts, the system comprising:
    at least one processor; and
    at least one memory coupled to the at least one processor and storing instructions which, when executed by the at least one processor, causes the system to perform operations including:
        electronically retrieving a chart of accounts from a new user's system, the chart of accounts indicating a plurality of accounts and an account name associated with each of the plurality of accounts;
        electronically retrieving, from at least one of a financial institution's system or a third party's system, one or more transactions each associated with at least one of a plurality of merchants;
        electronically retrieving, from a system database, a set of account sorting decisions made by prior system users and indicating a continuously updated association frequency between each of the plurality of merchants and a plurality of account names;
        generating an account name inference for each transaction by computationally analyzing the one or more transactions and the set of account sorting decisions according to a machine-learning algorithm incorporated with artificial intelligence for predictive model training operations;
        probabilistically matching each transaction of the one or more transactions with an associated merchant based on the generated account name inferences and the indicated association frequencies between the plurality of merchants and the plurality of account names; and
        automatically sorting the one or more transactions into the plurality of accounts indicated by the new user's chart of accounts based on the probabilistic matching.

2. The system of claim 1, wherein the matching is further based on a correlation between a respective account of the plurality of accounts and a string token datum associated with a respective merchant of the plurality of merchants.

3. The system of claim 1, wherein the matching is further based on a similarity between a respective account of the plurality of accounts and a string token datum associated with a respective merchant of the plurality of merchants.

4. The system of claim 1, wherein the matching is further based on a Jaccard Similarity Index similarity measure.

5. The system of claim 1, wherein the matching is further based on an Edit Distance similarity measure.

6. A method for automatically sorting a user's transactions into the user's chart of accounts, the method performed by one or more processors of a system and comprising:
    electronically retrieving a chart of accounts from a new user's system, the chart of accounts indicating a plurality of accounts and an account name associated with each of the plurality of accounts;
    electronically retrieving, from at least one of a financial institution's system or a third party's system, one or more transactions each associated with at least one of a plurality of merchants;
    electronically retrieving, from a system database, a set of account sorting decisions made by prior system users and indicating a continuously updated association frequency between each of the plurality of merchants and a plurality of account names;
    generating an account name inference for each transaction by computationally analyzing the one or more transactions and the set of account sorting decisions according to a machine-learning algorithm incorporated with artificial intelligence for predictive model training operations;
    probabilistically matching each transaction of the one or more transactions with an associated merchant based on the generated account name inferences and the indicated association frequencies between the plurality of merchants and the plurality of account names; and
    automatically sorting the one or more transactions into the plurality of accounts indicated by the new user's chart of accounts based on the probabilistic matching.

7. The method of claim 6, wherein the matching is further based on a correlation between a respective account of the plurality of accounts and a string token datum associated with a respective merchant of the plurality of merchants.

8. The method of claim 6, wherein the matching is further based on a similarity between a respective account of the plurality of accounts and a string token datum associated with a respective merchant of the plurality of merchants.

9. The method of claim 6, wherein the matching is further based on a Jaccard Similarity Index similarity measure.

10. The method of claim 6, wherein the matching is further based on an Edit Distance similarity measure.

* * * * *